United States Patent [19]
Oda et al.

[11] Patent Number: 4,914,738
[45] Date of Patent: Apr. 3, 1990

[54] APPARATUS FOR DISCRIMINATING LIGHT SOURCE HAVING SPECTRUM PEAKS

[75] Inventors: Kazuya Oda; Kiyotaka Kaneko, both of Tokyo, Japan

[73] Assignee: Fuji Photo Film Co., Ltd., Kanagawa, Japan

[21] Appl. No.: 241,959

[22] Filed: Sep. 8, 1988

[30] Foreign Application Priority Data

Sep. 10, 1987 [JP] Japan .................. 62-225343

[51] Int. Cl.$^4$ .................. G01J 1/02
[52] U.S. Cl. .................. 356/419; 354/430; 356/222; 356/226
[58] Field of Search .......... 356/402, 406, 407, 416, 356/419, 425, 218, 225, 226, 222; 250/226; 354/430

[56] References Cited

U.S. PATENT DOCUMENTS

| | | | |
|---|---|---|---|
| 4,041,308 | 8/1977 | Fujita | 250/214 P |
| 4,079,388 | 3/1978 | Takahama et al. | 354/473 |
| 4,220,412 | 9/1980 | Shroyer et al. | 356/226 |

Primary Examiner—F. L. Evans

[57] ABSTRACT

A light source discriminating apparatus includes three photosensors, two of which have similar spectral sensitivity characteristics to each other. The apparatus senses the difference in the energy distribution of light sources by comparing the ratios of the light intensity sensed by these photosensors. In this manner, the type of a light source having a spectrum peak in the energy distribution of the light emanating from the source may be discriminated as a fluorescent light source, for example. The results of discrimination may be used effectively for adjusting white balance or shutter speed of a video or electronic still camera.

10 Claims, 3 Drawing Sheets

APPARATUS FOR DISCRIMINATING LIGHT SOURCE HAVING SPECTRUM PEAKS

BACKGROUND OF THE INVENTION

1. Field of the Invention

This invention relates to an apparatus for discriminating a light source and, more particularly, to an apparatus for determining whether or not the light source which is to be used for illuminating an object to be shot or photographed with a video camera or an electronic still camera is a source of fluorescent light.

2. Description of the Prior Art

In shooting or photographing with a video camera or an electronic still camera, it is necessary is dependent upon a light source used for illuminating the object and to adjust the white balance. The adjustment of the white balance is dependent upon the measured color temperature. It is therefore necessary to identify the kind of the light source used for illuminating the object. In addition, since flicker occurs in the light emitted from the light source having spectrum peaks in the energy distribution thereof, it is also necessary, for example, to adjust the shutter speed of the camera to not less than 1/60 second for shooting a still image.

For meeting such requirements, a device for determining whether or not the light source is a fluorescent light source is disclosed in the Japanese Patent Laid-Open Publication No. 61-240790. As disclosed in the publication, for example, the fluorescent light source is identified by detecting whether the light intensity of the light source is changed at a frequency of 100 to 120 Hz. As it is known that the light intensity of the fluorescent light source is changed at that frequency range that fact can be used to identify the light source as fluorescent. Recently, however, a high-frequency lighting system has become popular as the lighting system for fluorescent lamps whereby flicker is reduced by switching lighting at a frequency of some hundred kHz. Since the brightness ripple is reduced under this system of the light source, the fluorescent light source cannot be determined accurately with the abovementioned prior-art device.

SUMMARY OF THE INVENTION

It is therefore an object of the present invention to overcome the above described deficiencies of the prior-art device and to provide an apparatus for identifying or discriminating the light source whereby the light source which has an energy spectrum peak at a specified wavelength can be identified effectively.

In accordance with the present invention, there is provided an apparatus for discriminating a light source emitting light having an energy spectrum peak at a specified wavelength from other light sources. The apparatus includes first photosensitive means having first spectral sensitivity characteristics, second photosensitive means having second spectral sensitivity characteristics exhibiting a peak at a wavelength range different from that of said first spectral sensitivity characteristics, and a third photosensitive means having spectral sensitivity characteristics having a peak wavelength range in the vicinity of that of the second spectral sensitivity characteristics. Computing means are included for receiving outputs from said respective photosensitive means for calculating a first ratio of the output from said first photosensitive means and the output from said second photosensitive means as well as a second ratio of the output from said first photosensitive means and the output from said third photosensitive means. In addition, the apparatus has a light source determining means for determining the kind of the light source based on the first ratio and the second ratio outputted from the computing means. The light source determining means compares the first and second ratios to determine whether the light source is of the type emitting the light having an energy spectrum peak at the specified wavelength.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Reference is now made to the accompanying drawings illustrating an apparatus for discriminating the light source according to a preferred embodiment of the present invention.

Figure 1:
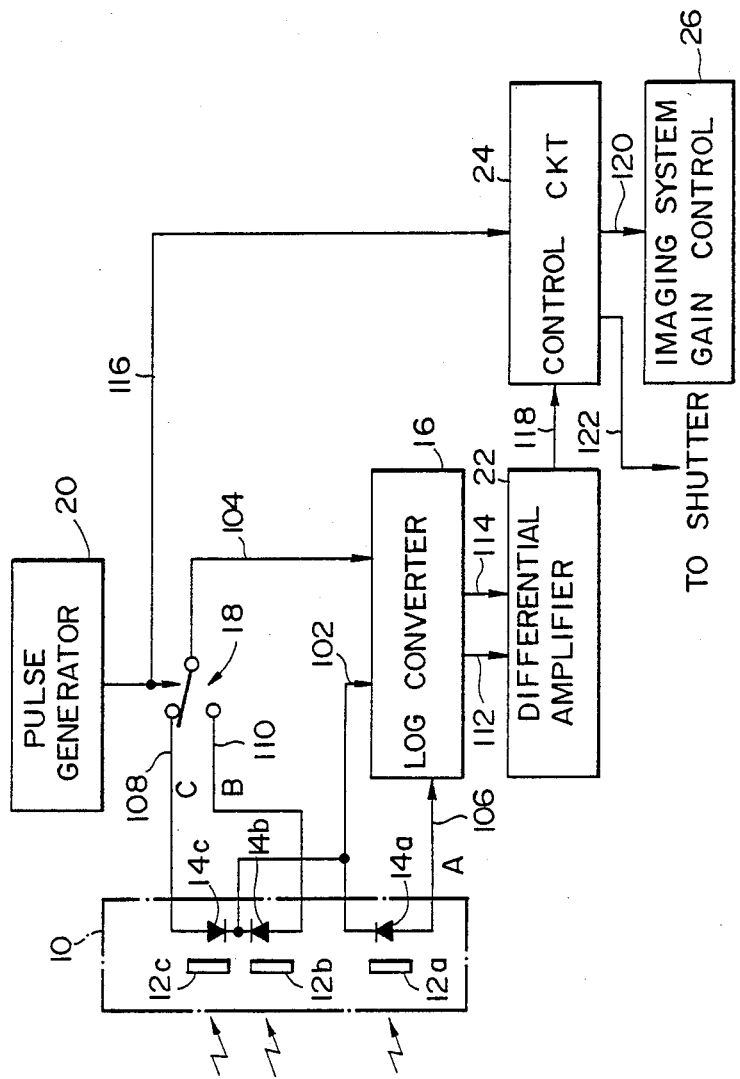
FIG. 1 is a block diagram of a gain control apparatus of the shooting system employing the light source discriminating apparatus of the present invention.

FIG. 1 shows an apparatus of the present for discriminating the fluorescent light source which can be used, for example, for effecting gain control of the shooting system of an electronic still camera.

The apparatus includes a light sensor 10 including three photosensitive units. The first, second and third photosensitive units are composed of filters 12a, 12b and 12c as well as photosensitive diodes 14a, 14b and 14c, respectively. These units sense associated spectral components of the light incident on the photosensitive diodes 14a, 14b and 14c through the filters 12a, 12b and 12c.

Figure 2:
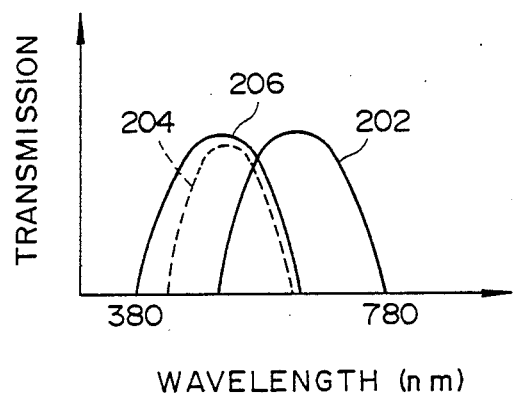
FIG. 2 is a chart showing spectral transmission characteristics of the filters shown in FIG. 1.

These filters 12a, 12b and 12c have spectral transmission characteristics 202, 204 and 206 as shown in FIG. 2, respectively. As shown therein, the peak for the spectral characteristics 202 of the filter 12a exists in a longer wavelength range, while that for the spectral characteristics 206 of the filter 12c exists in a shorter wavelength range. The peak for the spectral characteristics 204 of the filter 12b exists slightly towards the longer wavelength than that for the characteristics 206. The spectral characteristics 204 are similar in contour to the characteristics 206.

The cathodes of the photosensitive diodes 14a, 14b and 14c are connected via signal line 102 to a logarithmic converter 16. The output from the anode of the photosensitive diode 14a is supplied on signal line 106 to the logarithmic converter 16. Thus the signal representing the light intensity A incident on the diode 14a through filter 12a is introduced into the logarithmic converter 16 via signal line 106.

The anode of the photosensitive diode 14b is connected to one terminal 110 of a changeover switch 18, while the anode of the photosensitive diode 14c is connected to the other terminal 108 of the switch 18. Thus the signal representing the light intensity B incident on the diode 14b through filter 12b is outputted at the terminal 110, while the signal representing the light intensity C incident on the diode 14c through filter 12c is outputted at the terminal 108.

The changeover switch 18 is switched in response to pulses from a pulse generator 20 so that one of the signals outputted at the terminals 108 and 110, that is, one of the light intensity C and D, is selected to be transferred to signal line 104, with the output from the changeover switch 18 being supplied on signal line 104 to the logarithmic converter 16.

The logarithmic converter 16 converts inputs from signal lines 104 and 106 into a logarithmically compressed signal, using the input from signal line 102, that is, outputs from the cathodes of the photosensitive diodes 104a, 104b and 104c as the reference. More specifically, the circuit 16 converts the signals representative of the light intensity C and B alternately transmitted thereto from the changeover switch 18 over signal line 104 logarithmically to form resultant signals log C and log B to output these signals on signal line 114 to a differential amplifier 22, while also converting the signals representing the light intensity A transmitted thereto on signal line 106 logarithmically to form a resultant signal log A to transmit this signal on signal line 112 to the differential amplifier 22.

Differential amplifier 22 operates to find the difference between the signals transmitted thereto from the log converter 16 on signal lines 112 and 114, that is, log B−log A=log B/A and log C−log A=log C/A. The difference signals log B/A and log C/A are outputted on signal line 118 to a control circuit 24.

Control circuit 24 includes a microprocessor. Circuit 24 reads the signals representing log B/A and log C/A from the differential amplifier 22 in timed with the pulses transmitted thereto from the pulse generator 20. The circuit 24 evaluates the ratios B/A and C/A from the signals log B/A and log C/A obtained from the differential amplifier 22 to then determine whether the relation $$k1 \cdot B/A = k2 \cdot C/A$$

holds between both values. Circuit 24 determines whether or not the values B/A and C/A are proportional to each other. If not, the light source is determined to be of fluorescent, as later described. In accordance with the determination, the control circuit 24 outputs control signals on signal line 120 for adjusting white balance to a gain control circuit 26 of the imaging system, such as of an electronic still camera, not shown. The gain control circuit 26 is responsive to control signals from the control circuit 24 to control the gain of the imaging system.

When the light source is determined to be the source of fluorescent light, the control circuit 24 outputs control signals setting the shutter speed to not less than 1/60 second, for example, to a shutter control of the electronic still camera via signal line 122.

In operation, when light is transmitted from the light source via filters 12a, 12b and 12c, signals representative of the received light intensity A, B and C are developed by the photosensitive diodes 14a, 14b and 14c from the output terminals thereof in accordance with the spectral transmission characteristics 202, 204 and 206 of the filters 12a, 12b and 12c shown in FIG. 2.

When the changeover switch 18 is responsive to a timing pulse from the pulse generator 20 to connect the terminal 108 to signal line 104, the signal representing the light intensity C received at the photo-diode 14c is introduced over signal line 104 to the log converter 16 with the input from signal line 102 as the reference. Meanwhile, the signal representing the light intensity A received at the photo-diode 14a is introduced on signal line 106, with the input from signal line 102 as the reference.

The log converter 16 converts the input signals representative of the light intensity C and A logarithmically to output the signals representing log C and log A to the differential amplifier 22. The amplifier 22 finds the difference between the signals representing log C and log A to form a resultant signal representative of log C−log A=log C/A to deliver the resultant signal to the control circuit 24.

When changeover switch 18 is switched, on reception of a timing pulse from the pulse generator 20, to connect the terminal 110 to signal line 104, the signal representing the light intensity B received by the photo-diode 14b, with the input from signal line 102 as the reference, is supplied over signal line 104 to the log converter 16. At this time, the signal representing the light intensity A received by the diode 14a is also supplied on signal line 106 to the converter 16.

The log converter 16 converts the signals representing the light intensity B and A logarithmically to output signals representing log B and log A to the differential amplifier 22, which then gets the difference between the signals indicating log B and log A to form a signal log B−log A=log B/A to output the difference signal to the control circuit 24.

The control circuit 24 then receives, in response to timing pulses from the pulse generator 20, the signals log C/A and log B/A supplied from the differential amplifier 22 to find B/A and C/A from both signals and then proceeds to determining whether or not the relation $$k1 \cdot B/A = k2 \cdot C/A \tag{1}$$

holds between both signals. The k1 and k2 in the above formula are proportionality constants previously set to predetermined values.

Figure 3:
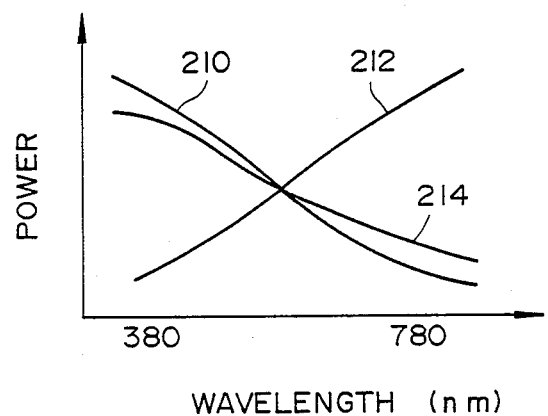
FIG. 3 is a chart plotting power distributions of the various light sources.

FIG. 3 shows the plots an energy or power distribution of a light source the energy of which is changed gradually as a function of the wavelength. As shown therein, the energy of a tungsten bulb light source 212, the daylight on a cloudy day 210 and the daylight on a fine day 214 are changed gradually as a function of wavelength. Thus the relation of the formula (1) holds between the incident light intensity A, B and C transmitted through filters 12a, 12b and 12c having the spectral characteristics 202, 204 and 206 as shown in FIG. 2.

Thus, in case of a light source having the light energy changing gradually with the wavelength, the energy difference is small for a small difference in wavelength, such that only a small difference exists between the light intensity B that has passed the filter having the spectral characteristics 204 and the light intensity C that has passed the filter having the spectral characteristics 206 is small. For this reason, the ratios of the light intensity B and C to the light intensity A that has passed the filter having the spectral characteristics 202 are proportional to each other, as discussed above.

Figure 4:
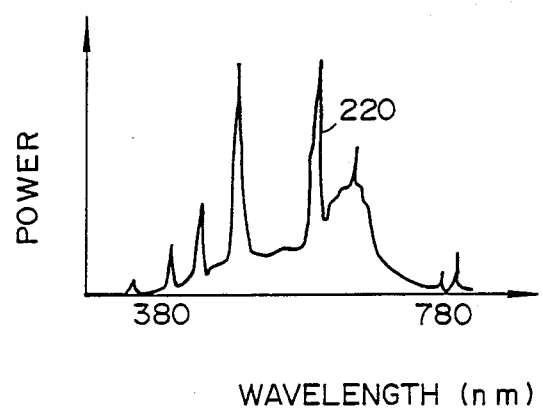
FIG. 4 is a chart plotting power distributions of a fluorescent light source.

FIG. 4 also shows the energy distribution of a fluorescent light source. As shown therein, the light emitted from the light source of fluorescence has energy peak points at certain specific wavelengths and, thus has an energy distribution different from the gradually changing energy distribution shown in FIG. 3, so that the proportional relationship of the formula (1) does not hold between the light intensity A, B and C incident through filters 12a, 12b and 12c.

The light incident from the fluorescent light has a peak point 220, shown for example in FIG. 4. The light intensity C incident from the source through filter 12c having the spectral characteristics 206 is smaller since it does not contain such a peak point. Conversely, the light intensity B incident from the source through filter 12b having the spectral characteristics 204 is considerably larger than the light intensity C since it does contain the peak point. Therefore, the proportional relationship of the formula (1) does not hold between the light intensity A, B and C.

Unless the relation of the formula (1) holds, the control circuit 24 determines the light source to be of fluorescence, and accordingly sets the value for adjusting the white balance to output the value to the gain control 26 of the imaging system. The control circuit 26 then causes an output adjustment unit from the imaging system of the electronic camera, not shown, to issue a control signal to control the gain of the output from the imaging system. When the light source is thus determined to be of fluorescence, the control circuit 24 issues a control signal for setting the shutter speed, for example, to not less than 1/60 second to the shutter control via signal line 122.

When the relation of the formula (1) holds, the control circuit 24 determines the light source to be other than the source of fluorescence. The control circuit 24 then finds the ratio of the light intensity B to light intensity A from the signal representing log B/A supplied from the differential amplifier 22 and, based on this ratio, determines the color temperature of the light source. The control circuit 24 sets the values for adjusting the white balance, in accordance with the thus found color temperature of the light source, and outputs the value to the gain control 26 of the imaging system. The control circuit 26 then controls the gain of the output from the imaging system of the electronic still camera, for example, in the same manner as described above.

According to the present embodiment, the light from the light source is caused to be incident on the apparatus through three filters 12a, 12b and 12c having different spectral characteristics 202, 204 and 206. Since these three filters are so selected that the spectral transmission characteristics of two of these filters are similar to each other in contour in the spectral distribution diagram thereof, it can be determined whether the above described proportional relationship exists between the incident light intensity A, B and C. Based on the proportional relationship, it is possible to determine whether the energy distribution of the light source is changed gradually or acutely, and hence to determine whether the light source is fluorescent.

According to the present embodiment, the difference in energy distribution between the fluorescent light source and the other types of light source is utilized to determine that the source is the fluorescent light source, so that the fluorescent light source can be identified accurately. In this manner, the shutter speed and the white balance of the electronic still camera or the video camera can be adjusted appropriately when shooting an object illuminated by the fluorescent light source.

In the above embodiment, three filters and the associated photosensitive diodes are used for determining whether the light source is fluorescent and for measuring the color temperature of the light source. However, the apparatus of the present invention may also be so modified that four or more filters and associated photodiodes are used for identifying the kinds of the light sources employed and sensing the color temperature. Also the apparatus of the present invention may be adapted for identifying the various kinds of light sources other than the fluorescent light source exhibiting spectrum peak points in the light energy distribution diagram thereof.

According to the present invention, three photosensors are utilized and the spectral sensitivity characteristics of two of these photosensors are similar in contour to each other. The ratios of the light intensity sensed by these photosensors are compared to each other to determine the energy distribution of the light sources. Thus it can be determined whether the light source is of the type exhibiting spectrum peaks in the energy distribution, such as the fluorescent light source, in a manner highly efficient for adjusting the photographing conditions such as the white balance or shutter speed.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. An apparatus for discriminating a light source emitting light having an energy spectrum peak at a specified wavelength from other light sources, said apparatus comprising:

first photosensitive means having first spectral sensitivity characteristics;

second photosensitive means having second spectral sensitivity characteristics exhibiting a peak at a wavelength range different from that of said first spectral sensitivity characteristics;

third photosensitive means having spectral sensitivity characteristics having a peak wavelength range in the proximity of that of said second spectral sensitivity characteristics;

computing means for receiving outputs from said respective photosensitive means for calculating a first ratio of the output from said first photosensitive means and the output from said second photosensitive means as well as a second ratio of the output from said first photosensitive means and the output from said third photosensitive means; and light source determining means for determining the kind of the light source based on the first ratio and the second ratio outputted from said computing means;

said light source determining means comparing the first and second ratios to determine whether the light source is of the type emitting the light having an energy spectrum peak at the specified wavelength.

2. An apparatus according to claim 1 wherein the light source emitting the light having the energy spectrum peak at the specified wavelength is a fluorescent light source.

3. An apparatus according to claim 1, wherein said computing means includes a logarithmic converting circuit and a differential amplifier;

said logarithmic converting circuit converting the outputs from said first, second and third photosensitive means logarithmically; and said differential amplifier finds a difference between the outputs developed from said first and second photosensitive means and converted by said logarithmic converting circuit logarithmically and the difference between the outputs developed from said first and third photosensitive means and converted by said logarithmic converting circuit logarithmically.

4. An apparatus according to claim 2, wherein said computing means includes a logarithmic converting circuit and a differential amplifier;

said logarithmic converting circuit converts the outputs from said first, second and third photosensitive means logarithmically; and said differential amplifier finds a difference between the outputs developed from said first and second photosensitive means and converted by said logarithmic converting circuit logarithmically and the difference between the outputs developed from said first and third photosensitive means and converted by said logarithmic converting circuit logarithmically.

5. An apparatus according to claim 3 further comprising a changeover switch for alternately selecting either of the outputs from said second photosensitive means and said third photosensitive means to said computing means.

6. An apparatus according to claim 4 further comprising a changeover switch for alternately selecting either of the outputs from said second photosensitive means and said third photosensitive means to said computing means.

7. An apparatus according to claim 1, wherein the first, second and third spectral sensitivity characteristics have sensitivity peaks at the respective specific wavelengths and sensitivities distributed substantially symmetrically about the sensitivity peaks, the sensitivity peak of the third spectral sensitivity characteristics being different from the sensitivity peak of the second spectral sensitivity characteristics.

8. An apparatus according to claim 2, wherein the first, second and third spectral sensitivity characteristics have sensitivity peaks at the respective specific wavelengths and sensitivities distributed substantially symmetrically about the sensitivity peaks, the sensitivity peak of the third spectral sensitivity characteristics being different from the sensitivity peak of the second spectral sensitivity characteristics.

9. An apparatus according to claim 1, wherein said light source determining means also determines the color temperature of the light source upon comparing two of the outputs from said first, second and third photosensitive means.

10. An apparatus according to claim 2, wherein said light source determining means also determines the color temperature of the light source upon comparing two of the outputs from said first, second and third photosensitive means.

* * * * *